(12) United States Patent (10) Patent No.: US 8,401,121 B1
Ozgur (45) Date of Patent: Mar. 19, 2013

(54) SYMBOL ERROR DETECTION FOR BLUETOOTH BASIC DATA RATE PACKETS

(75) Inventor: Soner Ozgur, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 12/779,208

(22) Filed: May 13, 2010

(51) Int. Cl.
H03D 3/00 (2006.01)
(52) U.S. Cl. ........ 375/334; 375/329; 375/331; 375/332; 375/340; 375/373; 375/376
(58) Field of Classification Search .................. 375/334, 375/329, 331, 332, 340, 373, 376
See application file for complete search history.

(56) References Cited

U.S. PATENT DOCUMENTS

| | | | |
|---|---|---|---|
| 4,644,562 A * | 2/1987 | Kavehrad et al. | 375/232 |
| 5,241,567 A | 8/1993 | Shimakata | |
| 5,301,210 A | 4/1994 | Vandamme et al. | |
| 5,550,506 A | 8/1996 | Tsumura | |
| 5,928,379 A | 7/1999 | Hattori | |
| 6,018,544 A | 1/2000 | Kotzin et al. | |
| 6,859,504 B1 * | 2/2005 | Kowalski | 375/345 |
| 7,756,082 B1 | 7/2010 | Dhamdhere | |
| 7,970,920 B1 | 6/2011 | Dinan | |
| 2002/0118665 A1 | 8/2002 | Cleveland et al. | |
| 2003/0045333 A1 | 3/2003 | Kimata et al. | |
| 2003/0058036 A1 | 3/2003 | Stillman et al. | |
| 2005/0039103 A1 | 2/2005 | Azenko et al. | |
| 2005/0097409 A1 | 5/2005 | Shin et al. | |
| 2005/0111485 A1 | 5/2005 | Bruckmann et al. | |
| 2009/0147732 A1 | 6/2009 | Tsao | |
| 2010/0067401 A1 | 3/2010 | Medvedev et al. | |
| 2011/0289379 A1 | 11/2011 | Uhlemann | |

OTHER PUBLICATIONS

U.S. Appl. No. 12/779,209, filed May 13, 2010, Ozgur, Soner.
Bluetooth Core Specification v3.0 + HS -Procedures for Flow Control and Retransmission, vol. 3, Part A. Section 8 http://WWW.bluetooth.comlEnglish/Technology/Building/PagesiSpecification_aspx Obtained from internet on Dec. 28, 2010, pp. 130-176.
U.S. Appl. No. 12/719,978 Office Action, Apr. 25, 2012, 20 pages.
Co-Pending U.S. Appl. No. 12/719,978, filed Mar. 9, 2010, 43 pages.
U.S. Appl. No. 12/779,209 Office Action, Jul. 5, 2012, 7 pages.

* cited by examiner

*Primary Examiner* — Kabir A Timory
(74) *Attorney, Agent, or Firm* — DeLizio Gilliam, PLLC

(57) ABSTRACT

A symbol error detector can be configured to detect symbol errors of GFSK modulated portions of a Bluetooth packet without relying solely on a CRC error detection mechanism. The symbol error detector can operate on frequency error signals that are a difference between a frequency associated with a current symbol and predetermined frequency outputs from a bank of filters matched to a frequency response of the Bluetooth receiver for predefined combinations of three consecutive symbols (i.e., an estimated previously decoded symbol, an estimated current symbol, and an estimated subsequent symbol). The frequency error signals can be compared against a threshold and against each other to determine a potential unreliability in decoding the current symbol and to determine whether to generate a symbol error notification. The frequency error signals being within a threshold of each other can indicate potential unreliability in decoding the current symbol.

22 Claims, 6 Drawing Sheets

SYMBOL ERROR DETECTION FOR BLUETOOTH BASIC DATA RATE PACKETS

BACKGROUND

Embodiments of the inventive subject matter generally relate to the field of wireless network devices and, more particularly, to symbol error detection for Bluetooth® basic data rate packets.

Bluetooth basic data rate (BDR) packets are modulated using Gaussian frequency shift keying (GFSK) modulation techniques. In addition to Bluetooth BDR packets, GFSK is also used to modulate a header of a Bluetooth enhanced data rate (EDR) packet. In a frequency shift keying (FSK) modulation scheme, a binary one is represented by a positive frequency deviation and a binary zero is represented by a negative frequency deviation. GFSK is a type of FSK modulation technique that utilizes a Gaussian filter to smooth positive/negative frequency deviations. The Gaussian pulse shaping improves spectral efficiency for Bluetooth signals.

SUMMARY

Various embodiments for detecting symbol errors in a Bluetooth basic data rate packet are disclosed. In one embodiment, a frequency associated with a first symbol of a received signal is determined at a receiver of a wireless network device. The received signal comprises a plurality of symbols. A frequency output associated with each of a plurality of predefined symbol combinations is generated at each of a plurality of filters matched to a frequency response of the receiver for a corresponding each of the plurality of predefined symbol combinations. A frequency error, associated with each of the plurality of predefined symbol combinations, that indicates a difference between the frequency output associated with each of the plurality of predefined symbol combinations and the frequency associated with the first symbol of the received signal is calculated. It is determined, based on comparing the frequency error associated with the each of the plurality of symbol combinations, that a first frequency error associated with a first of the plurality of predefined symbol combinations is within a threshold of a second frequency error associated with a second of the plurality of predefined symbol combinations. A symbol error notification is generated based on determining that the first frequency error associated with the first of the plurality of predefined symbol combinations is within the threshold of the second frequency error associated with the second of the plurality of predefined symbol combinations.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
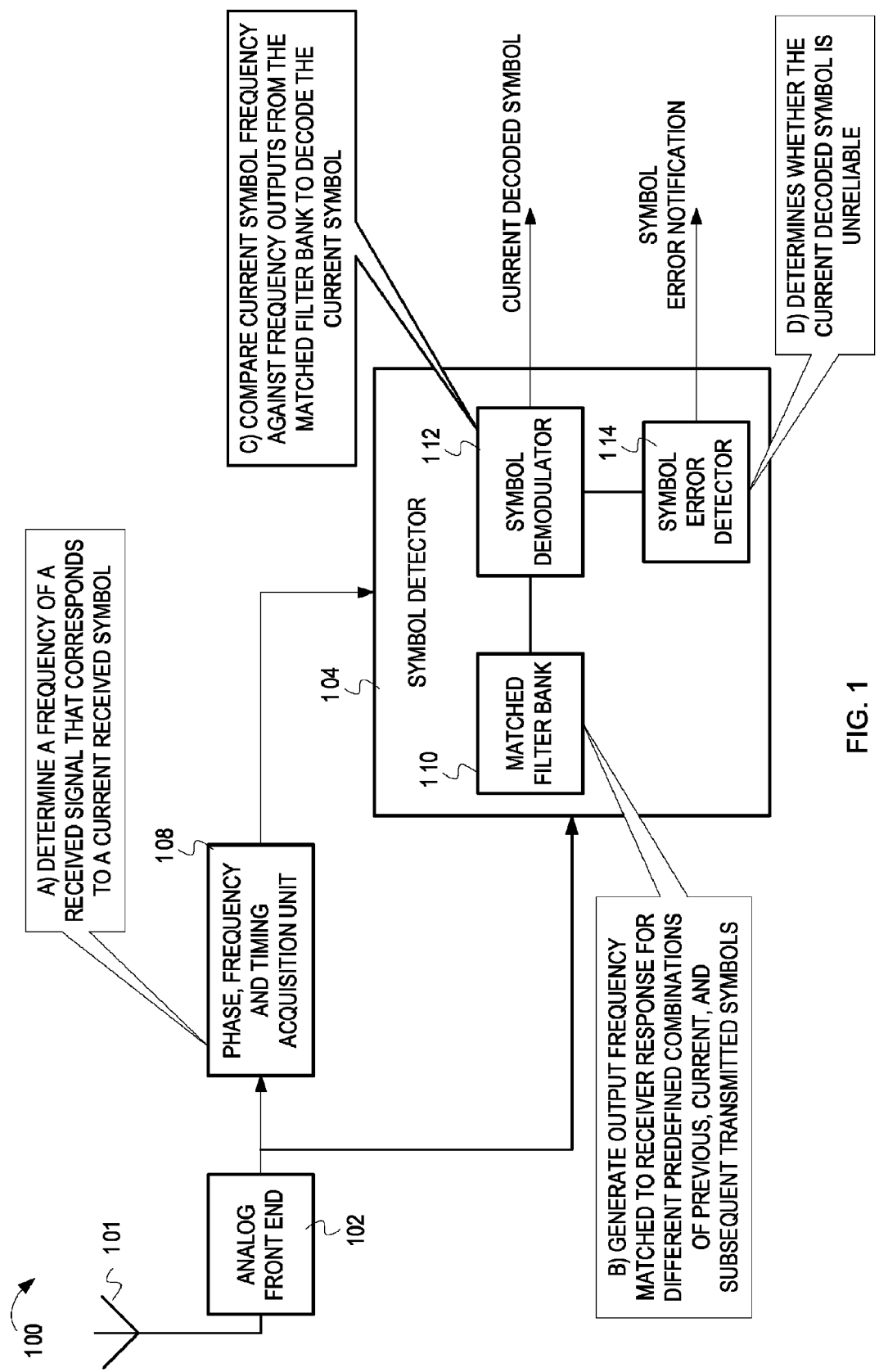
FIG. 1 is an example block diagram illustrating a Bluetooth receiver configured for detecting symbol errors in GFSK modulated Bluetooth packets.

The description that follows includes exemplary systems, methods, techniques, instruction sequences, and computer program products that embody techniques of the present inventive subject matter. However, it is understood that the described embodiments may be practiced without these specific details. For instance, although examples refer to symbol error detection for Bluetooth basic data rate packets, embodiments are not so limited. In some implementations, other communication standards and devices (e.g., Digital Enhanced Cordless Telecommunications (DECT)) that implement a GFSK modulation scheme may also implement the symbol error detection mechanism described herein. In other instances, well-known instruction instances, protocols, structures, and techniques have not been shown in detail in order not to obfuscate the description.

In a Bluetooth basic data rate (BDR) packet, the length of a Bluetooth BDR packet payload is transmitted as part of the payload. A bit error in the payload length field can mislead a Bluetooth receiver and can result in data corruption. Although Bluetooth protocols implement adaptive frequency hopping to minimize symbol errors due to noisy communication channels, in some implementations, adaptive frequency hopping may not react quickly enough to mask communication channels that are too noisy or that are subject to high co-channel interference. Bluetooth packets that are exchanged in the presence of such interference can become corrupted. The Bluetooth receiver typically uses a cyclic redundancy check (CRC) error detection mechanism to detect symbol errors in the Bluetooth BDR packet payloads. However, the CRC error detection mechanism may not be sufficient to detect symbol errors in large data transfers. For example, the probability of receiving a corrupted Bluetooth BDR packet payload and a CRC-16 error detection mechanism not detecting the corrupted payload can be approximately 1.5 E-5. In other words, there is a relatively high probability that incorrectly decoded packets may be provided to upper protocol layers (e.g., a Bluetooth link controller) for subsequent processing. Because of the unreliable CRC error detection mechanism, errors in the corrupted Bluetooth BDR packets may not be detected and the corrupted Bluetooth BDR packets may be provided to the upper protocol layers, resulting in data corruption. Moreover, because the Bluetooth BDR packet is modulated using GFSK, inter-symbol-interference is introduced (as part of the GFSK modulation scheme) for frequency and phase continuity of a Bluetooth baseband signal. Therefore, a GFSK demodulator in the Bluetooth receiver uses knowledge of previous decoded symbols to decode a current symbol. Thus, an undetected symbol error could affect decoding of subsequent symbols in the Bluetooth BDR packet. Additionally, the header of the Bluetooth BDR and EDR packets, which is also modulated using GFSK, might be corrupted and the CRC error detection mechanism may be unable to detect the corrupted header. Providing the corrupted header to the upper protocol layers can cause disruption in communication protocols which, in turn, can result in disruption of a communication link between the Bluetooth receiver and a Bluetooth transmitter.

A symbol error detector can be implemented in a Bluetooth receiver to analyze the GFSK-modulated portions of Bluetooth packets (e.g., the Bluetooth BDR packets and the header of the Bluetooth EDR packet) and to determine the reliability of symbols within the analyzed Bluetooth packets. The symbol error detector can detect symbol errors that may be overlooked, or that may pass undetected, through the CRC error detection mechanism. The symbol error detector can operate on error signals that are a difference between a frequency of the received signal (associated with a current symbol) and predetermined frequency outputs from a bank of filters. Each filter in the bank of filters is matched to a frequency response of the Bluetooth receiver for a predefined symbol combination of three consecutive symbols (i.e., a previously demodulated symbol, the current symbol, and a subsequent symbol). The symbol error detector can compare the error signals and can generate a symbol error notification if the error signals are within a predetermined threshold of each other. Comparing the error signals associated with different symbol combinations is equivalent to comparing the probability of decoding the current symbol as a binary one versus decoding the current symbol as a binary zero. If it is equally probable that the current symbol maybe decoded as a binary zero or a binary one, the symbol error detector can indicate potential unreliability of the decoded current symbol. The symbol error detector can enable the Bluetooth receiver to achieve a high symbol error detection rate and a low false alarm rate. The symbol error detector can improve reliability of the GFSK-modulated Bluetooth packets and can enable efficient Bluetooth modulation rate adaptation, frequency hopping, closed loop power control between Bluetooth devices, etc.

FIG. 1 is an example block diagram illustrating a Bluetooth receiver 100 configured for detecting symbol errors in GFSK modulated Bluetooth packets. The Bluetooth receiver 100 comprises an antenna 101, an analog front end 102, a phase, frequency, and timing acquisition unit 108, and a symbol detector 104. The symbol detector 104 comprises a matched filter bank 110, a symbol demodulator 112, and a symbol error detector 114. The symbol demodulator 112 is coupled to the matched filter bank 110 and to the symbol error detector 114.

Figure 2:
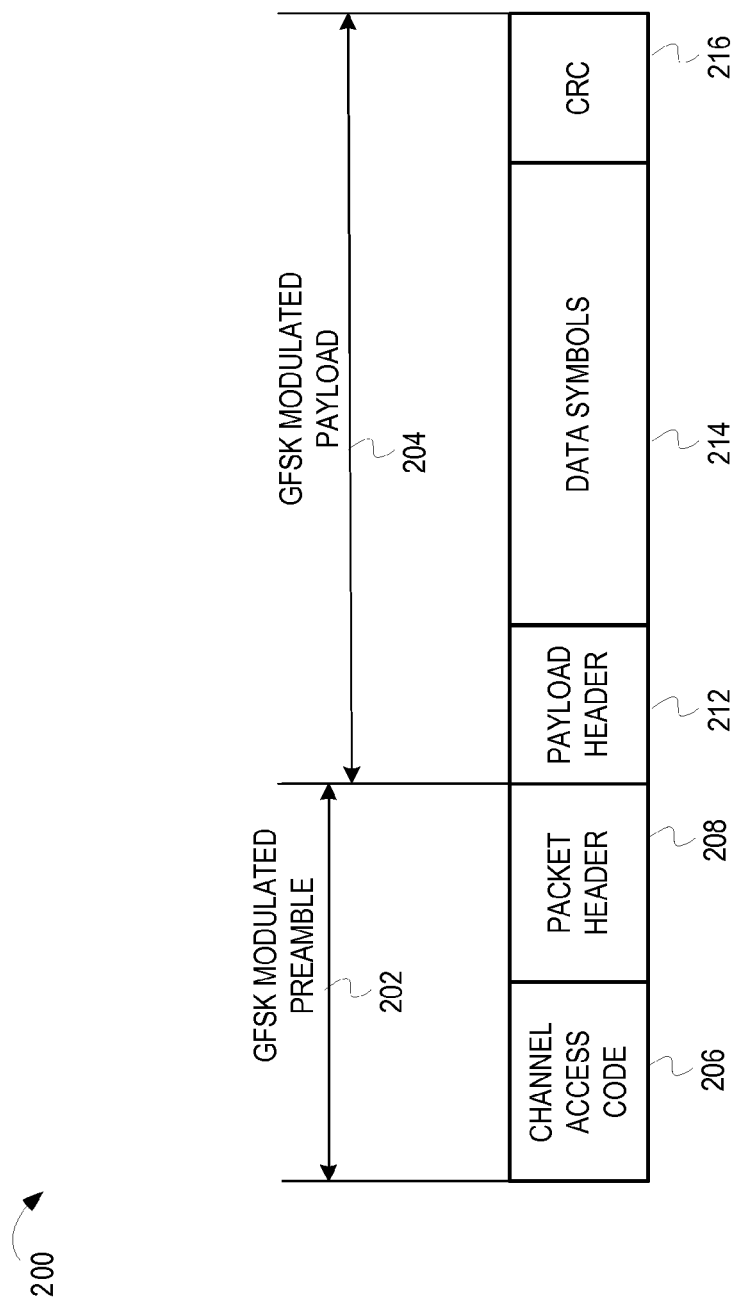
FIG. 2 illustrates an example format of a Bluetooth basic data rate packet.

At the Bluetooth receiver 100, the antenna 101 receives an RF signal and provides the received RF signal to the analog front end 102. The received RF signal comprises a GFSK modulated Bluetooth packet. FIG. 2 depicts an example format of the GFSK modulated Bluetooth packet 200. As depicted in FIG. 2, the Bluetooth packet 200 comprises a GFSK modulated preamble 202 and a GFSK modulated payload 204. The preamble 202 can comprise a channel access code 206 and a packet header 208. The channel access code 206 may be used for synchronization, DC-offset compensation, packet identification, paging and inquiry operations, etc. The packet header 208 can comprise link control information that identifies the type of Bluetooth packet 200 being transmitted (e.g., asynchronous connectionless link (ACL) packet, synchronous connection oriented (SCO) packet, etc.), information about the payload 204, a transmitting and destination wireless network devices, etc. The payload 204 comprises a payload header 212 that can indicate the length of the Bluetooth packet 200. The payload 204 also comprises data symbols 214 (e.g., data from applications, user data, etc.). The payload 204 may also comprise additional information (e.g., cyclic redundancy check (CRC) 216) to enable error detection in the Bluetooth packet 200. In a Bluetooth BDR packet, both the preamble and the payload are modulated using the GFSK modulation scheme. In a Bluetooth enhanced data rate (EDR) packet, only the preamble is modulated using the GFSK modulation scheme. The analog front end 102 can include 1) one or more amplifying stages to amplify the received RF signal, 2) one or more filtering stages to remove unwanted bands of frequencies, 3) mixer stages to downconvert the received RF signal, 4) an automatic gain control (AGC) unit to adjust the gain to an appropriate level for a range of received signal amplitude levels, 5) an analog to digital converter (ADC) to convert the received RF signal into a digital signal, etc. It is noted that the Bluetooth receiver 100 can comprise addition components not depicted in FIG. 1.

After initial processing by the analog front end 102 and other digital processing units, the GFSK modulated Bluetooth packet is provided to the phase, frequency, and timing acquisition unit 108. The phase, frequency, and timing acquisition unit 108 can comprise a coordinate rotation digital computer (CORDIC) that calculates a magnitude and frequency of the GFSK modulated Bluetooth packet. The phase, frequency, and timing acquisition unit 108 can use the magnitude and the phase of the GFSK modulated Bluetooth packet for timing acquisition and timing tracking. The phase, frequency, and timing acquisition unit 108 can also use the phase of the GFSK modulated Bluetooth packet for frequency and phase acquisition.

The data symbols 214 that constitute the payload 204 of the Bluetooth BDR packet 200 are represented by frequency variations in the received RF signal. As was described above, the frequency of the received RF signal varies depending on the current symbol. In other words, if a first symbol is a binary one, the frequency of the received signal during a time interval that corresponds to the first symbol has a positive frequency deviation. If a second symbol is a binary zero, the frequency of the received signal during a time interval that corresponds to the second symbol has a negative frequency deviation. At stage A, the phase, frequency, and timing acquisition unit 108 determines the frequency of the received signal that corresponds to a time interval of a current symbol ("current symbol frequency") and provides the current symbol frequency to the symbol detector 104.

At stage B, the matched filter bank 110 of the symbol detector 104 generates an output frequency matched to a receiver response for different predefined combinations of previous, current, and subsequent transmitted symbols ("symbol combinations"). In the symbol combination, the least significant bit (LSB) designates a symbol received after the current symbol ("subsequent symbol"), the second LSB designates the current symbol, and the most significant bit (MSB) designates a symbol received before the current symbol ("previous symbol"). The matched filter bank 110 comprises a bank of filters (depicted in FIG. 3) that are matched to the frequency response of the Bluetooth receiver 100 for all possible transmitted symbol combinations, as will be further described below with reference to FIG. 3. For example, a symbol combination of 100 implies that the previous symbol was decoded as "1", the current symbol is assumed to be "0", and that the subsequent symbol is assumed to be "0". The filter matched to the symbol combination 000, generates a frequency output based on knowledge that the previous symbol was 0, assuming that the current symbol is 0, and assuming that the subsequent symbol will be 0. The filter in the matched filter bank 110 associated with the symbol combination 100 generates a frequency output that is equivalent to the frequency response of the Bluetooth receiver 100 assuming that the three consecutive symbols received by the Bluetooth receiver were 1, 0, and 0. The frequency outputs generated by the matched filter bank 110 are provided to the symbol demodulator 112. Additionally, the symbol demodulator 112 also receives the current symbol frequency (e.g., from the CORDIC of the phase, frequency, and timing acquisition unit 108).

At stage C, the symbol demodulator 112 compares the current symbol frequency against the frequency outputs generated by the matched filter bank 110 to decode the current symbol ("current decoded symbol"). The symbol demodulator 112 determines a frequency error associated with each symbol combination by calculating a difference between the current symbol frequency and the frequency output (generated by the matched filterbank 110) that corresponds to the symbol combination. The symbol demodulator 112 then determines the current decoded symbol based on determining the symbol combination with the lowest frequency error, as will be further described below in FIG. 3. In other words, if the frequency error associated with the symbol combination 010 is determined to be the lowest frequency error, the symbol demodulator 112 decodes that the current symbol as a binary one.

At stage D, the symbol error detector 114 determines whether the current decoded symbol is unreliable. The symbol error detector 114 can compare the frequency error associated with each of the symbol combinations and can generate a symbol error notification to indicate unreliability of the current decoded symbol if the frequency errors approach each other or are within a predetermined threshold of each other. In other words, the symbol error detector 114 can determine whether the probability that the current symbol was correctly decoded is approximately equal to the probability that the current symbol was incorrectly decoded. If so, the symbol error detector 114 can generate the symbol error notification indicating the potential unreliability of the current decoded symbol. It is noted that in some implementations, the threshold may be an absolute error threshold. In other implementations, dynamic variation of thresholds may be used to support the variability of frequency offsets, modulation indices, timing drifts, etc. of the Bluetooth protocol. In some implementations, the symbol error detector 114 may generate the symbol error notification if the number of symbols between the current decoded symbol and a previously detected symbol error is greater than a burst error length threshold. In other implementations, the symbol error detector 114 may generate the symbol error notification irrespective of the number of symbols between the current decoded symbol and the last detected symbol error.

Figure 3:
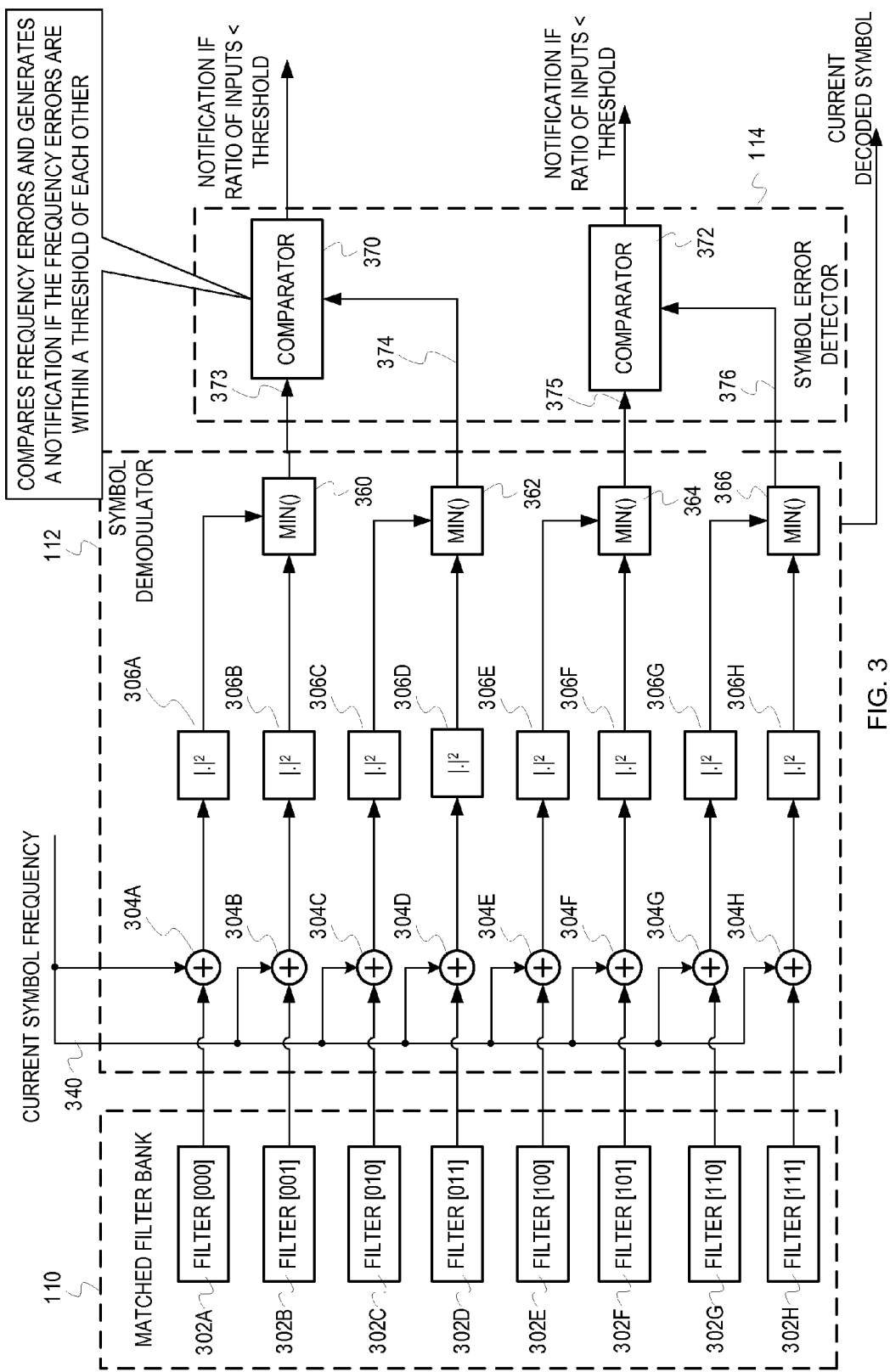
FIG. 3 is an example block diagram of a symbol error detector.

FIG. 3 is an example block diagram of the symbol error detector 104. As illustrated by FIG. 3, the symbol error detector 104 comprises the matched filterbank 110, the symbol demodulator 112, and the symbol error detector 114. In one embodiment, as depicted in FIG. 3, the matched filter bank 110 comprises eight matched filters 302A-302H—each of which is matched to a receiver response for a predefined combination of three consecutive symbols—an estimated previous symbol, an estimated current symbol, and an estimated subsequent symbol. For example, the filter 302E is matched to the receiver response for a transmitted symbol combination of 100. In other words, the filter 302E generates a frequency output based on knowledge that the previous symbol was decoded as a binary one, an assumption that the current symbol will be decoded as a binary zero, and an assumption that the subsequent symbol will be decoded as a binary zero. In other words, if the symbol demodulator 112 had received three consecutive symbols 1, 0, and 0, the frequency output generated by the filter 302E would be equivalent to the current symbol frequency. In the matched filterbank 110, the filters 302A-302D generate the frequency output when the previous symbol is decoded as a binary zero.

Likewise, the filters 302E-302H generate the frequency output when the previous symbol is decoded as a binary one.

The frequency output generated by each of the matched filters 302A-302H in the matched filterbank 110 is provided to the symbol demodulator 112. Additionally, the symbol demodulator 112 also receives the current symbol frequency 340. As was described above, the current symbol frequency is the frequency of a received Bluetooth signal during a time interval that corresponds to the current symbol. As depicted in FIG. 3, the symbol demodulator 112 comprises subtractors 304A-304H, error calculators 306A-306H, and minimum calculators 308A-308H. The frequency output from each of the eight filters 302A-302H in the matched filter bank 110 is provided to the corresponding subtractor 304A-304H. The other input to each of the subtractors 304A-304H is the current symbol frequency 340. The subtractors 304A-304H subtract the current symbol frequency 340 from the frequency output of their respective matched filters 302A-302H to yield a frequency error signal. In some embodiments, the frequency error signal generated at the output of the subtractors 304A-304H is provided to the respective error calculators 306A-306H to calculate a squared magnitude of the frequency error signals. In other embodiments, the error calculators 306A-306H may calculate the absolute value of the frequency error signals. The frequency error associated with symbol combinations that differ only in the subsequent symbol are then compared to determine a lowest frequency error. In other words, the frequency error generated by the error calculators 306A (associated with the symbol combination 000) and 306B (associated with the symbol combination 001) are provided to a minimum calculator (min( )) 360. The frequency error generated by the error calculators 306C (associated with the symbol combination 010) and 306D (associated with the symbol combination 011) are provided to a minimum calculator 362. The frequency error generated by the error calculators 306E and 306F are provided to a minimum calculator 364. The frequency error generated by the error calculators 306G and 306H are provided to a minimum calculator 366.

The symbol demodulator 112 then decodes the current symbol to yield a current decoded symbol based on determining the symbol combination associated with the lowest frequency error. In other words, in addition to providing the output from the minimum calculators 360, 362, 364, and 366 to the symbol error detector 114 (as depicted in FIG. 3), the symbol demodulator 112 can also compare the output from the minimum calculators 360, 362, 364, and 366 and select the symbol combination associated with the lowest frequency error. For example, a decoding unit (not shown) can compare the output from the minimum calculators 360, 362, 364, and 366 and can select the symbol combination associated with the lowest frequency error. Consequently, the decoding unit can determine the current decoded symbol. In some implementations, the decoding unit may compare the frequency errors at the output of the error calculators 306A-306H, identify the symbol combination associated with the lowest frequency error, and accordingly determine the current decoded symbol. For example, the decoding unit may compare frequency errors associated with each of the symbol combinations, determine that the frequency error associated with the symbol combination 101 is the lowest frequency error, and accordingly decode the current symbol as a binary zero because the second bit of the symbol combination 101 corresponds to the current symbol. It is noted that in some implementations, depending on the previous symbol, the decoding unit may compare the frequency errors associated with only a subset of the symbol combinations. For example, if the previous symbol was determined to be a binary zero, the decoding unit may compare the frequency errors associated with the symbol combinations 000, 001, 010, 011 (because the most significant bit of the symbol combinations indicates the previous symbol) to decode the current symbol. Thus, the decoding unit may compare frequency errors associated with the symbol combinations 000, 001, 010, and 011, determine that the frequency error associated with the symbol combination 001 is the lowest frequency error, and accordingly decode the current symbol as a binary zero because the second bit of the symbol combination 001 corresponds to the current symbol.

The symbol demodulator 112 also provides the output of the minimum calculators 360 and 362 to a comparator 370. The symbol demodulator 112 provides the output of the minimum calculators 364 and 366 to a comparator 372. As illustrated, the comparators 370 and 372 are part of the symbol error detector 114. The output 373 of the minimum calculator 360 is a function of the probability that the current decoded symbol is "0" based on knowledge that the previous decoded symbol was also "0" (i.e., $f(p\{s[n]=0|s[n-1]=0\})$. The output 374 of the minimum calculator 362 is a function of the probability that the current decoded symbol is "1" based on knowledge that the previous decoded symbol was 0 (i.e., $f(p\{s[n]=1|s[n-1]=0\})$. The output 375 of the minimum calculator 364 is a function of the probability that the current decoded symbol is "0" based on knowledge that the previous decoded symbol was 1 (i.e., $f(p\{s[n]=0|s[n-1]=1\})$. The output 376 of the minimum calculator 366 is a function of the probability that the current decoded symbol is "1" based on knowledge that the previous decoded symbol was also 1 (i.e., $f(p\{s[n]=1|s[n-1]=1\})$. The comparators 370 and 372 generate a symbol error notification if the ratio of their inputs is less than a predetermined threshold, as will be further described below with reference to FIGS. 4-5. In one implementation, the comparators 370 and 372 generate the symbol error notification if the ratio of their inputs is less than twice a predetermined threshold. The predetermined threshold or the multiplicative factor applied to the predetermined threshold may be determined empirically, based on test data, historical analysis, etc. The symbol error detector 114 provides the symbol error notification, if any, to a link controller or to another suitable subsequent data processing unit. The link controller can accordingly discard the unreliable Bluetooth packet, request that the discarded Bluetooth packet be retransmitted, etc.

It is noted that, in some implementations, based on knowledge of the previous decoded symbol, only a subset of the filters in the matched filterbank 110 may be taken into consideration when demodulating the current symbol. The filters in the matched filterbank 110 that generate the frequency output based on the previous decoded symbol may be taken into consideration when demodulating the current symbol. For example, the symbol demodulator 112 may determine that the previous symbol was decoded as a binary zero. Accordingly, outputs of the filters 302A-302D in the matched filterbank 110 that generate the frequency output when the previous decoded symbol is a binary zero may be taken into consideration to demodulate the current symbol. The symbol demodulator 112 may evaluate frequency errors associated with the four symbol combinations where the previous decoded symbol is a binary zero (i.e., the symbol combinations 000, 001, 010, and 011) to decode the current symbol. In this case, only the comparator 370 may be active (the comparator 372 may be inactive because the previous symbol was decoded as a binary zero) and may determine whether the frequency errors are within the threshold. Likewise, if it is determined that the previous symbol was decoded as a binary one, the filters 302E-302H that generate the frequency output when the previous decoded symbol is a binary one may be taken into consideration to demodulate the current symbol. The symbol demodulator 112 may evaluate frequency errors associated with the four symbol combinations where the previous decoded symbol is a binary one (i.e., the symbol combinations 100, 101, 110, and 111) to decode the current symbol. In this case, only the comparator 372 may be active and may determine whether the frequency errors are within the threshold.

Figure 4:
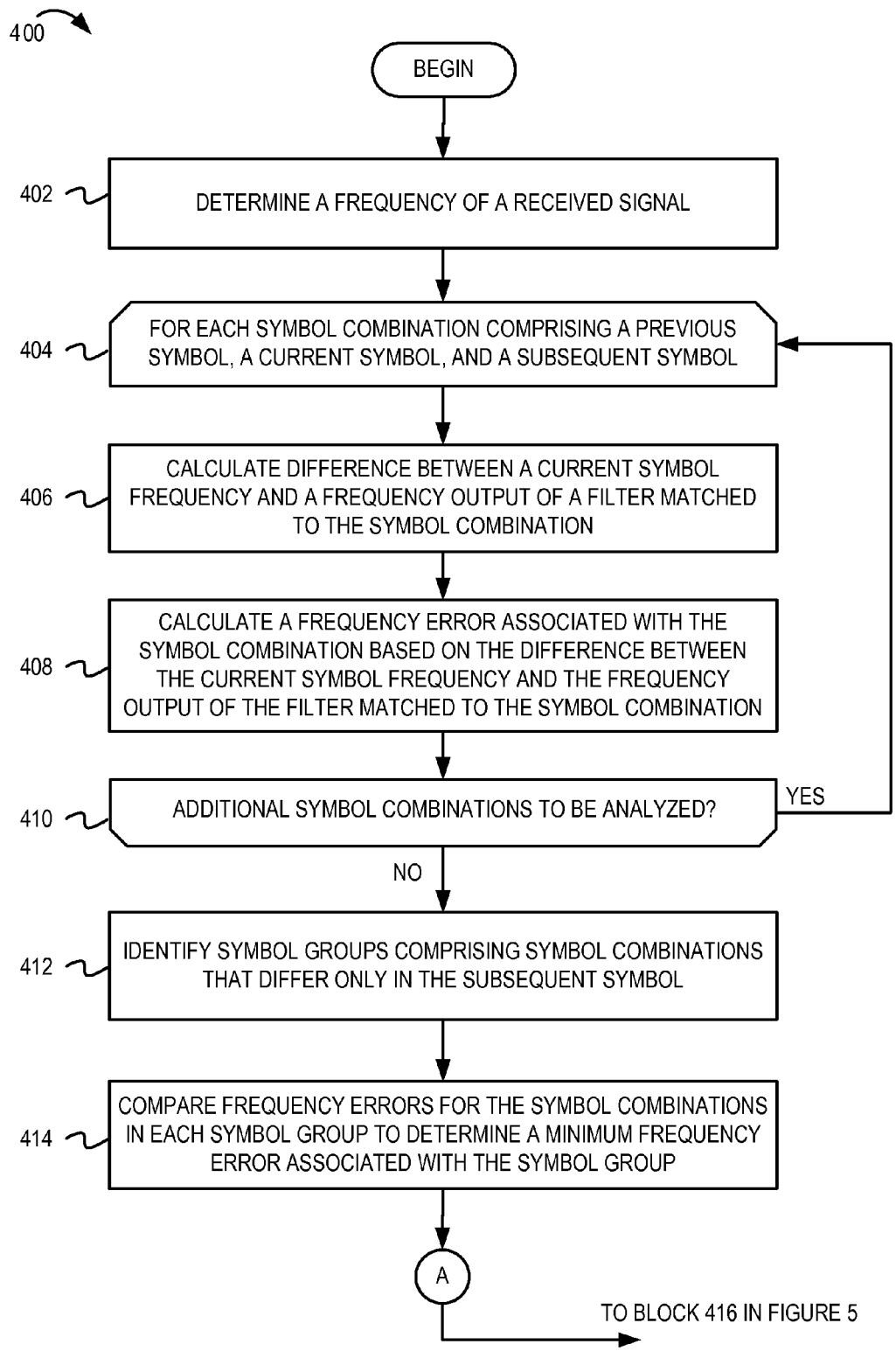
FIG. 4 depicts a flow diagram illustrating example operations for detecting symbol errors in Bluetooth basic data rate packets.
Figure 5:
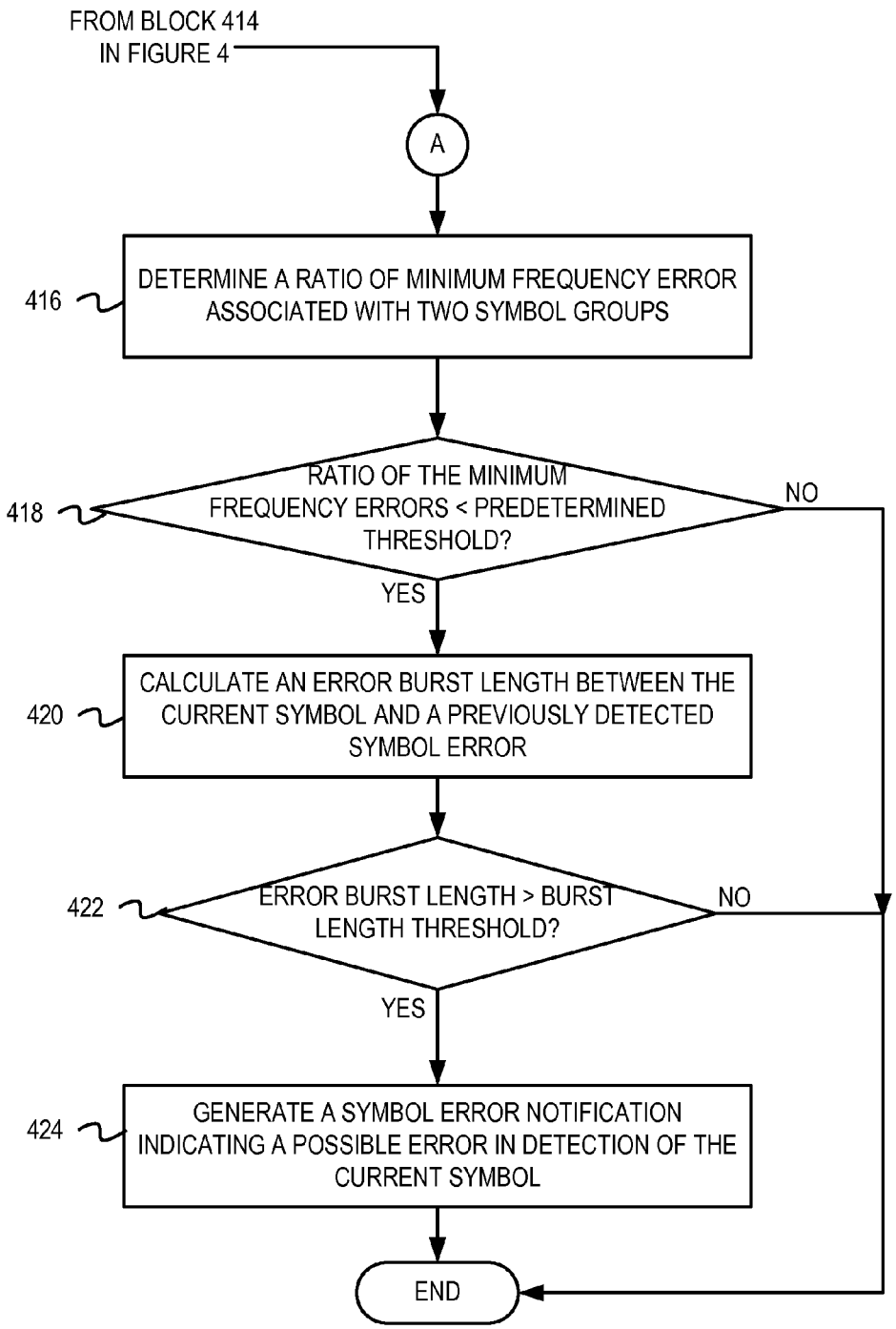
FIG. 5 depicts the flow diagram illustrating example operations for detecting symbol errors in Bluetooth basic data rate packets.

FIG. 4 and FIG. 5 depict a flow diagram illustrating example operations for detecting symbol errors in Bluetooth basic data rate packets. Flow 400 begins at block 402 in FIG. 4.

At block 402, a frequency of a received signal is determined. Bluetooth basic data rate packets are modulated signal Gaussian frequency shift keying (GFSK). In the GFSK modulation scheme, information is represented by frequency variations. In other words, the frequency of the received signal during the time interval that corresponds to a symbol ("current symbol frequency") indicates whether the symbol (e.g., transmitted by a transmitting Bluetooth device) is a binary zero or a binary one. In one example, the current symbol frequency may be determined based on a phase difference determined by a CORDIC of the phase, frequency, and timing acquisition unit 108 of FIG. 1. The flow continues at block 404.

At block 404, a loop begins for each symbol combination comprising a previous symbol, a current symbol, and a subsequent symbol. The GFSK modulation scheme intentionally introduces inter-symbol interference for frequency and phase continuity of a Bluetooth baseband signal. Therefore, the symbol detector 104 of FIG. 1 decodes the current symbol based on knowledge of the previous symbol. The flow continues at block 406.

At block 406, a difference between the current symbol frequency and a frequency output of a filter matched to the symbol combination is determined to yield a frequency error associated with the symbol combination. For example, a filter (e.g., the filter 302A of FIG. 3) in the matched filterbank 110 associated with the symbol combination 000 generates the frequency output. The filter 302A associated with the symbol combination 000 generates a frequency output that is equivalent to the Bluetooth receiver frequency response assuming that the Bluetooth receiver had received 0, 0, and 0 as the previous symbol, the current symbol, and the subsequent symbol, respectively. The subtractor (e.g., the subtractor 304A of FIG. 3) generates the difference between the current symbol frequency and the frequency output of the filter matched to the symbol combination 000. Each matched filter in the matched filterbank 110 generates a frequency output that is matched to the receiver response for the symbol combination to which the matched filter corresponds. In FIG. 3, the filters 302A-302D generate a receiver response based on knowledge that the previous decoded symbol decoded was a binary zero. The filters 302E-302H generate a receiver response based on knowledge that the previous decoded symbol decoded was a binary one. The current symbol is decoded taking into consideration the previous decoded symbol and a possible subsequent symbol. The filter matched to the symbol combination 110 generates a frequency output based on knowledge that the previous symbol was decoded as a binary one, on an assumption that the current symbol will be decoded as a binary one, and on an assumption that the subsequent symbol will be decoded as a binary zero. In other words, if the Bluetooth receiver 100 had received three consecutive symbols 1, 1, and 0, the frequency output generated by the filter would be equivalent to the frequency at the (e.g., at the output of the CORDIC or the frequency, phase, and timing acquisition unit 108). The flow continues at block 408.

At block 408, a frequency error associated with the symbol combination is calculated. For example, the error calculator 306A of FIG. 3 calculates the frequency error associated with the symbol combination from the difference between the current symbol frequency and the frequency output of the filter matched to the symbol combination. In one implementation, the error calculator 306A can calculate the frequency error as the squared magnitude of the difference between the current symbol frequency and the frequency output of the filter matched to the symbol combination. In another implementation, the error calculator 306A can calculate the frequency error as the absolute value of the difference between the current symbol frequency and the frequency output of the filter matched to the symbol combination. The flow continues at block 410.

At block 410, it is determined whether there exist additional symbol combinations to be analyzed. It may be determined whether there exist additional symbol combinations to be analyzed based on knowledge of the previous decoded symbol. As described with reference to FIG. 3, if it is determined that the previous symbol was decoded as a binary zero, the symbol combinations 000, 001, 010, and 011 may be analyzed. Alternately, if it is determined that the previous symbol was decoded as a binary one, the symbol combinations 100, 101, 110, and 111 may be analyzed. If it is determined that there exist additional symbol combinations to be analyzed, the flow loops back to block 404 where a next symbol combination is identified and operations described with reference to blocks 406-408 are performed for the next symbol combination. If it is determined that there do not exist additional symbol combinations to be analyzed, the flow continues at block 412. It is noted that although FIG. 4 depicts operations for calculating the frequency error (blocks 404-410) being performed sequentially for each symbol combination, embodiments are not so limited. In some implementations, the frequency error associated with the symbol combinations to be analyzed may be performed concurrently as depicted in FIG. 3.

At block 412, symbol groups comprising symbol combinations that differ only in the subsequent symbol are identified. For example, the symbol detector 112 identifies the symbol groups comprising symbol combinations that differ only in the subsequent symbol. Referring to the example of FIG. 3, the symbol combinations 000 and 001 differ from each other only in the subsequent symbol (i.e., the least significant bit of the symbol combinations). Thus, the symbol combinations 000 and 001 comprise a symbol group. As will be described below, frequency errors associated with the constituent symbol combinations of the symbol group can be compared against each other to integrate over different realizations of the subsequent symbol. The flow continues at block 414.

At block 414, the frequency error associated with each constituent symbol combination of the symbol group is compared to determine a minimum frequency error associated with the symbol group. For example, the minimum calculator 360 of FIG. 3 compares the frequency error associated with one constituent symbol combination in the symbol group with the frequency error associated with another constituent symbol combination in the symbol group to determine the minimum frequency error associated with the symbol group. Because a symbol combination comprises three symbols (the previous symbol, the current symbol, and the subsequent symbol), there exist four symbol combinations for any given previous symbol and consequently two symbol groups. With reference to the example of FIG. 3, based on knowledge that the previous symbol is decoded as a binary one, the four symbol combinations are 100, 101, 110, and 111. Accordingly, the two symbol groups each comprising two constituent symbol combinations are A) a first symbol group comprising constituent symbol combinations 100 and 101, and B) a second symbol group comprising constituent symbol combinations 110 and 111. With reference to FIG. 3, the minimum calculator 364 for the first symbol group compares the frequency error associated with the symbol combination 100 to the frequency error associated with the symbol combination 101 to determine the minimum frequency error associated with the first symbol group. Likewise, the minimum calculator 366, for the second symbol group, compares the frequency error associated with the symbol combination 110 to the frequency error associated with the symbol combination 111 to determine the minimum frequency error associated with the second symbol group. The minimum calculators 364 and 366 compare the frequency errors as described above to marginalize and integrate over all possible realizations of the subsequent symbol, which has not been received. The flow continues at block 416 in FIG. 5.

At block 416, a ratio of the minimum frequency errors associated with the two symbol groups that correspond to the previous decoded symbol is determined. For example, the symbol error detector 114 of FIG. 3 determines the ratio of the minimum frequency errors associated with the two symbol groups. For example, with reference to FIG. 3, the comparator 372 can receive the minimum frequency errors from the minimum calculators 364 and 366 if the previous symbol was decoded as a binary one. One input to the comparator 372 is the frequency error 375 generated assuming that the current symbol was decoded as a binary zero (i.e., the output of the minimum calculator 364). The other input to the comparator 372 is the frequency error 376 generated assuming that the current symbol was decoded as a binary one (i.e., the output of the minimum calculator 366). The comparator 372 calculates the ratio of the frequency error 375 to the frequency error 376. It is noted that in another implementation, the comparator 372 may calculate the ratio of the frequency error 376 to the frequency error 375. Likewise, the comparator 370 can receive the minimum frequency errors from the minimum calculators 360 and 362 if the previous symbol was decoded as a binary zero. One input to the comparator 370 is the frequency error 373 generated assuming that the current symbol was decoded as a binary zero (i.e., the output of the minimum calculator 360). The other input to the comparator 370 is the frequency error 374 generated assuming that the current symbol was decoded as a binary one (i.e., the output of the minimum calculator 362). The comparator 370 can calculate the ratio of the frequency error 373 to the frequency error 374. It is noted that in another implementation, the comparator 370 may calculate the ratio of the frequency error 374 to the frequency error 373. The flow continues at block 418.

At block 418, it is determined whether the ratio of the minimum frequency errors is less than a predetermined threshold. For example, the comparator 372 in the symbol error detector 114 may determine whether the ratio of the minimum frequency errors is less than the predetermined threshold. The ratio of the frequency error 375 and the frequency error 376 being too low (e.g., less than the predetermined threshold), indicates that the frequency errors 375 and 376 are close to each other and that the symbol demodulator 112 may not reliably decode the current symbol to either a binary zero or a binary one. In other words, the ratio frequency errors 375 and 376 being less than the predetermined threshold can indicate that the probability of correctly decoding the current symbol is very close to the probability of incorrectly decoding the current symbol. Conversely, ratio of the frequency errors 375 and 376 being greater than the predetermined threshold indicates that the current symbol can be reliably decoded to either a binary zero or a binary one. Multiplicative thresholding may be applied to combat expected uncertainties in modulation index and frequency offset. As an example, the comparator 374 may determine whether the ratio of the frequency error 375 and 376 is less than twice the predetermined threshold. The predetermined threshold and/or the multiplicative factor applied to the predetermined threshold may be determined empirically, based on test data, historical analyses, etc. Thus, determining that the ratio of the minimum frequency errors is less than the predetermined threshold can indicate that the current decoded symbol may be unreliable. In some implementations, if it is determined that the current decoded symbol may be unreliable, a symbol error notification may be provided to a Bluetooth link controller. In this case, operations for determining an error burst length, which will be described in blocks 420 and 422, may not be performed. In other implementations, the operations for determining the error burst length may be performed to determine whether to transmit the symbol error notification to the Bluetooth link controller. In one implementation, if it is determined that the ratio of the minimum frequency errors is less than the predetermined threshold, the flow continues at block 420. Otherwise, it is determined that the current decoded symbol may be reliably decoded and the flow ends.

At block 420, in response to determining that the current decoded symbol may be unreliable, an error burst length between the current decoded symbol and a previously detected symbol error is calculated. In one implementation, the symbol error detector 114 can calculate the error burst length between the current decoded symbol (i.e., a potential current symbol error) and the previously detected symbol error. In another implementation, an error burst calculator (not shown) that may be either part of or distinct from the error detection unit 114 may calculate the error burst length. In addition to detecting a potential symbol error, the symbol error detector 114 can also determine when a symbol error was last detected in the Bluetooth BDR packet. The symbol error detector 114 can calculate the error burst length as the number of symbols between the previously detected symbol error and the current decoded symbol in the Bluetooth BDR packet (endpoints inclusive). In one implementation, the symbol error detector 114 can keep track of a position of the previously detected symbol error in the Bluetooth BDR packet and can calculate the number of symbols between the previously detected symbol error and the current decoded symbol. The flow continues at block 422.

At block 422, it is determined whether the error burst length is greater than a burst length threshold. For example, the symbol error detector 114 determines whether the error burst length is greater than the burst length threshold. The burst length threshold indicates a minimum number of symbols between successive symbol errors that will cause an erroneously demodulated symbol to pass through to subsequent processing units without detection (e.g., by a CRC error detection mechanism). Comparing the error burst length to the burst length threshold can be used to improve the false alarm rate of the symbol detector 102, rather than relying solely on capabilities of the CRC error detection mechanism. In some implementations, the burst length threshold can be set so as to catch errors that might not be detected by the CRC error detection mechanism. For example, the CRC-16 error detection mechanism typically detects symbol errors that are not more than 16 bits (i.e., 16 symbols for a GFSK modulation scheme) apart. The burst length threshold, in this case, may be set accordingly to catch errors that might not be detected by the CRC-16 error detection mechanism. If it is determined that the error burst length is greater than the burst length threshold, the flow continues at block 424. Otherwise, the flow ends.

At block 424, a symbol error notification is generated to indicate a possible error in detection of the current symbol. For example, the symbol error detector 114 generates the symbol error notification to indicate a potential error in decoding the current symbol and to indicate a potential unreliability of the current decoded symbol. The symbol error notification may be provided to the symbol demodulator 112 which, in turn, may prevent transmission of the current decoded symbol to subsequent processing units (e.g., a Bluetooth link controller). In another example, the symbol error notification may be provided to the subsequent processing units. The subsequent processing units can discard the current decoded symbol and the Bluetooth packet and can request retransmission of the discarded Bluetooth packet. From block 424, the flow ends.

It should be understood that the depicted diagrams (FIGS. 1 through 5) are examples meant to aid in understanding embodiments and should not be used to limit embodiments or limit scope of the claims. Embodiments may perform additional operations, fewer operations, operations in a different order, operations in parallel, and some operations differently. For instance, although FIG. 5 describes the symbol error detector 114 determining the error burst length and generating the symbol error notification if the error burst length is greater than the burst length threshold, embodiments are not so limited. In some implementations, the symbol error detector 114 may not determine the error burst length. Instead, the symbol error detector 114 may generate the symbol error notification on detecting the symbol error irrespective of whether the error burst length is small enough to enable detection of the symbol error during CRC error detection. In some implementations, the symbol error detector 114 may not generate the symbol error notification if the error burst length is less than the burst length threshold. In other words, the symbol error detector 114 may not provide the symbol error notification to the Bluetooth link controller if the symbol error detector 114 determines that the error burst length is less than the burst length threshold. Instead, the symbol error detector 114 may rely on the CRC error detection mechanism to detect the symbol error.

It is also noted that although FIGS. 1-5 describe the symbol error being determined based, in part, on the frequency output generated by a bank of filters matched to symbol combinations of three consecutive symbols (i.e., the previous symbol the current symbol, and the subsequent symbol), embodiments are not so limited. In other embodiments, the symbol combination can comprise any suitable number of symbols. For example, a symbol combination may comprise four consecutive symbols—two previous decoded symbols, the current symbol, and the subsequent symbol. Accordingly, in other embodiments, the matched filterbank 110 may comprise 16 filters—each of which is matched to a unique combination of the aforementioned four symbols (0000-1111). Additionally, the matched filterbank 110 may comprise filters that take into account circuit impairments (which originate in the analog front end 102 or in the transmitting device) such as modulation index and/or frequency offset deviations from nominal values. For example, a subset of filters of the matched filterbank 110 may be matched to a modulation index $h_1$, which is not equal to the nominal value of the modulation index as defined by the Bluetooth specification. Another subset of filters of the matched filterbank 110 may be matched to a different modulation index $h_2$. Different subsets of filters matched to different modulation indices may be used to improve symbol decision of the Bluetooth receiver 100 and also to track the corresponding circuit impairments. This can improve the performance of the symbol detector 104. Finally, it is noted that although FIGS. 1-5 describe operations for detecting symbol errors in a Bluetooth BDR packet, in other implementations, the operations described in FIGS. 1-5 may also be implemented for detecting symbol errors in the preamble of the Bluetooth EDR packet.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
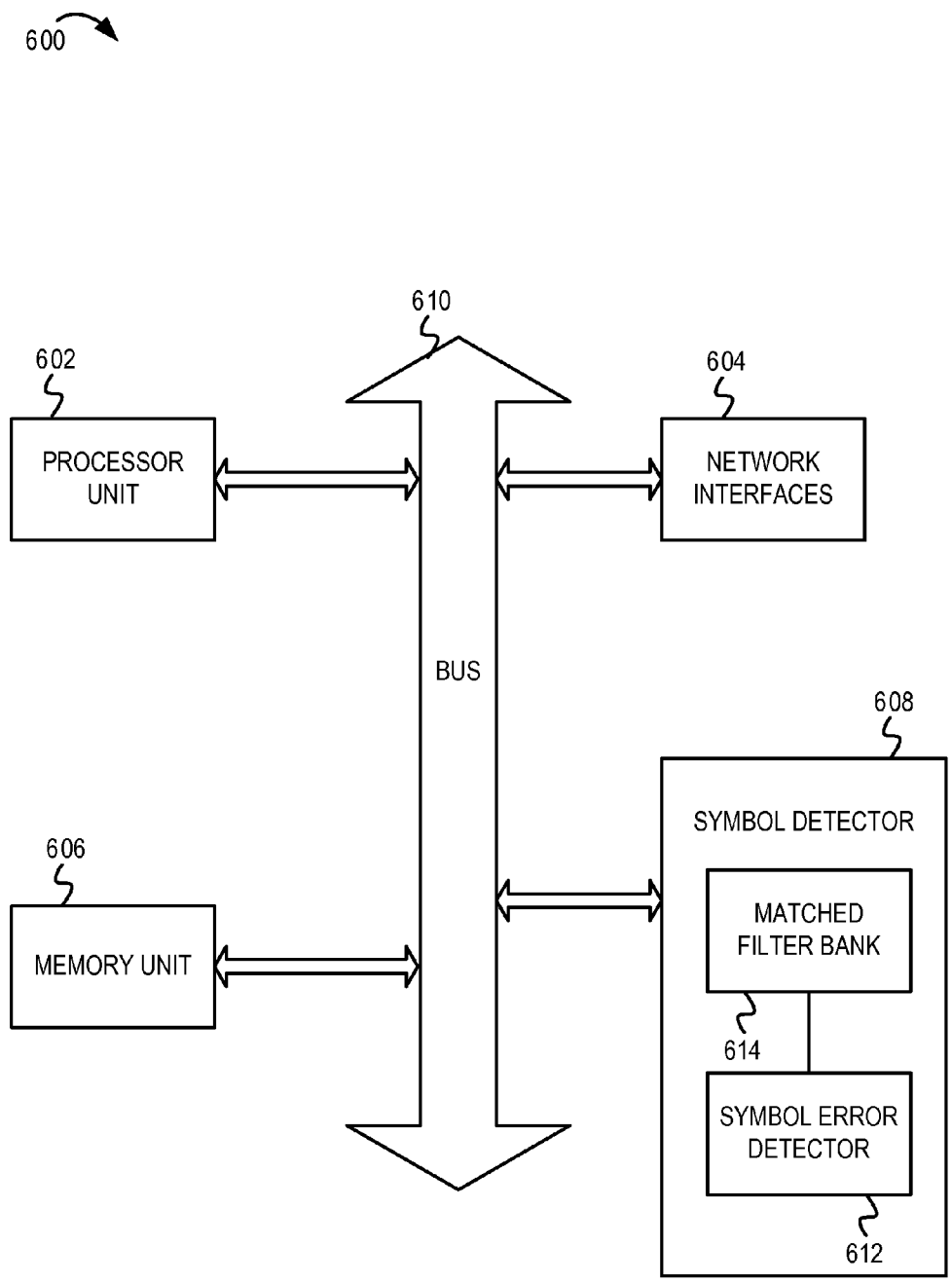
FIG. 6 is a block diagram of one embodiment of a wireless network device including a symbol error detection mechanism.

FIG. 6 is a block diagram of one embodiment of a wireless network device 600 including a symbol error detection mechanism. In some implementations, the wireless network device 600 may comprise a Bluetooth integrated circuit (IC), or both a Bluetooth IC and a wireless local area network (WLAN) IC. The wireless network device 600 may be embedded in another electronic device (e.g., a personal computer (PC), a laptop, a netbook, a mobile phone, a personal digital assistant (PDA), or other electronic system). The wireless network device 600 includes a processor unit 602 (possibly including multiple processors, multiple cores, multiple nodes, and/or implementing multi-threading, etc.). The wireless network device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The wireless network device 600 also includes a bus 610 (e.g., PCI, ISA, PCI-Express, HyperTransport®, InfiniBand®, NuBus, etc.), and network interfaces 604 that include at least one wireless network interface (e.g., a WLAN interface, a Bluetooth® interface, a WiMAX interface, a ZigBee® interface, a Wireless USB interface, etc.).

The wireless network device 600 also comprises a symbol detector 608. The symbol detector 608 comprises a matched filter bank 614 coupled to a symbol error detector 612. The symbol detector 608 is configured to perform operations for detecting symbol errors in received GFSK modulated Bluetooth packets (e.g., Bluetooth BDR packets and preambles of Bluetooth EDR packets), as described above with reference to FIGS. 1-5. Any one of these functionalities may be partially (or entirely) implemented in hardware and/or on the processing unit 602. For example, the functionality may be implemented with an application specific integrated circuit, in logic implemented in the processing unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the storage device(s), and the network interface 604 are coupled to the bus 610. Although illustrated as being coupled to the bus 610, the memory 606 may be coupled to the processor unit 602.

While the embodiments are described with reference to various implementations and exploitations, it will be understood that these embodiments are illustrative and that the scope of the inventive subject matter is not limited to them. In general, techniques for symbol error detection for Bluetooth basic data rate packets as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining, at a receiver of a wireless network device, a frequency associated with a first symbol of a received signal, wherein the received signal comprises a plurality of symbols;
    generating, at each of a plurality of filters matched to a frequency response of the receiver for a corresponding each of a plurality of predefined symbol combinations, a frequency output associated with each of the plurality of predefined symbol combinations;
    calculating a frequency error, associated with each of the plurality of predefined symbol combinations, that indicates a difference between the frequency output associated with each of the plurality of predefined symbol combinations and the frequency associated with the first symbol of the received signal;
    determining, based on comparing the frequency error associated with the each of the plurality of predefined symbol combinations, that a first frequency error associated with a first of the plurality of predefined symbol combinations is within a threshold of a second frequency error associated with a second of the plurality of predefined symbol combinations; and
    generating a symbol error notification based on said determining that the first frequency error associated with the first of the plurality of predefined symbol combinations is within the threshold of the second frequency error associated with the second of the plurality of predefined symbol combinations.

2. The method of claim 1, wherein said calculating the frequency error associated with each of the plurality of predefined symbol combinations that indicates the difference between the frequency output associated with each of the plurality of predefined symbol combinations and the frequency associated with the first symbol of the received signal, further comprises:
    determining a squared magnitude of the difference between the frequency output associated with each of the plurality of predefined symbol combinations and the frequency associated with the first symbol of the received signal to yield the frequency error associated with each of the plurality of predefined symbol combinations, or
    determining an absolute value of the difference between the frequency output associated with each of the plurality of predefined symbol combinations and the frequency associated with the first symbol of the received signal to yield the frequency error associated with each of the plurality of predefined symbol combinations.

3. The method of claim 1, wherein said determining that the first frequency error associated with the first of the plurality of predefined symbol combinations is within the threshold of the second frequency error associated with the second of the plurality of predefined symbol combinations further comprises:
    determining a ratio of the first frequency error associated with the first of the plurality of predefined symbol combinations and the second frequency error associated with the second of the plurality of predefined symbol combinations; and
    comparing the ratio against the threshold for said determining that the frequency error associated with the first of the plurality of predefined symbol combinations is within the threshold of the frequency error associated with the second of the plurality of predefined symbol combinations.

4. The method of claim 1, further comprising:
    grouping the plurality of predefined symbol combinations to form a plurality of symbol groups, wherein each of the plurality of predefined symbol combinations comprises an estimated previously decoded symbol, an estimated current symbol, and an estimated subsequent symbol, wherein a subset of the plurality of predefined symbol combinations that constitute each of the plurality of symbol groups differ only in the estimated subsequent symbol;
    for each of the plurality of symbol groups, comparing frequency errors associated with the subset of the plurality of predefined symbol combinations that constitute each of the plurality of symbol groups to identify a minimum frequency error associated with each of the plurality of symbol groups;
    in response to determining a previously decoded symbol, identifying a first and a second of the plurality of symbol groups that constitute predefined symbol combinations with the previously decoded symbol; and
    determining a ratio of a first minimum frequency error associated with the first of the plurality of symbol groups and a second minimum frequency error associated with the second of the plurality of symbol groups, wherein the first minimum frequency error associated with the first of the plurality of symbol groups is the first frequency error associated with the first of the plurality of predefined symbol combinations and the second minimum frequency error associated with the second of the plurality of symbol groups is the second frequency error associated with the second of the plurality of predefined symbol combinations.

5. The method of claim 4, wherein said determining that the first frequency error associated with the first of the plurality of predefined symbol combinations is within the threshold of the second frequency error associated with the second of the plurality of predefined symbol combinations further comprises:
    comparing the ratio of the first minimum frequency error associated with the first of the plurality of symbol groups and the second minimum frequency error associated with the second of the plurality of symbol groups against the threshold.

6. The method of claim 5, wherein said generating the symbol error notification is in response to determining that the ratio of the first minimum frequency error associated with the first of the plurality of symbol groups and the second minimum frequency error associated with the second of the plurality of symbol groups is less than the threshold.

7. The method of claim 4, further comprising
    determining that the first minimum frequency error associated with the first of the plurality of symbol groups is a smallest of the minimum frequency errors associated with each of the plurality of symbol groups;
    determining that the first minimum frequency error associated with the first of the plurality of symbol groups corresponds to the first frequency error associated with the first of the plurality of predefined symbol combinations; and
    decoding the first symbol of the received signal based on said determining that the first minimum frequency error associated with the first of the plurality of symbol groups corresponds to the first frequency error associated with the first of the plurality of predefined symbol combinations.

8. The method of claim 7, wherein said decoding the first symbol of the received signal further comprises:
    identifying the estimated current symbol from the first of the plurality of predefined symbol combinations based, at least in part, on said determining that the first minimum frequency error associated with the first of the plurality of symbol groups corresponds to the first frequency error associated with the first of the plurality of predefined symbol combinations; and designating, as a decoded first symbol, the estimated current symbol identified from the first of the plurality of predefined symbol combinations.

9. The method of claim 1, wherein said generating the symbol error notification further comprises:

determining a number of symbols between a current symbol error and a previously detected symbol error, wherein the current symbol error is associated with the first symbol of the received signal;

comparing the number of symbols between the current symbol error and the previously detected symbol error to a predetermined burst length threshold, wherein the predetermined burst length threshold indicates a minimum number of symbols between two consecutive symbol errors that will cause an erroneously demodulated symbol to be undetected; and generating the symbol error notification in response to determining that the first frequency error associated with the first of the plurality of predefined symbol combinations is within the threshold of the second frequency error associated with the second of the plurality of predefined symbol combinations and that the number of symbols between the current symbol error and the previously detected symbol error is greater than the predetermined burst length threshold.

10. The method of claim 9, further comprising discarding the first symbol based, at least in part, on determining that the first frequency error associated with the first of the plurality of predefined symbol combinations is within the threshold of the second frequency error associated with the second of the plurality of predefined symbol combinations and that the number of symbols between the current symbol error and the previously detected symbol error is greater than the predetermined burst length threshold.

11. The method of claim 1, further comprising discarding the first symbol based, at least in part, on determining that the first frequency error associated with the first of the plurality of predefined symbol combinations is within the threshold of the second frequency error associated with the second of the plurality of predefined symbol combinations.

12. The method of claim 1, wherein the plurality of symbols are modulated using a Gaussian frequency shift keying (GFSK) modulation scheme.

13. A wireless network device comprising:

a frequency detector operable to determine a frequency associated with a first symbol of a received signal, wherein the received signal comprises a plurality of symbols;

a matched filterbank comprising a plurality of filters matched to a frequency response of the wireless network device for a corresponding each of a plurality of predefined symbol combinations, the matched filterbank operable to generate, at each of the plurality of filters, a frequency output associated with each of the plurality of predefined symbol combinations;

a symbol error detector operable to:

calculate a frequency error, associated with each of the plurality of predefined symbol combinations, that indicates a difference between the frequency output associated with each of the plurality of predefined symbol combinations and the frequency associated with the first symbol of the received signal;

determine, based on comparing the frequency error associated with the each of the plurality of predefined symbol combinations, that a first frequency error associated with a first of the plurality of predefined symbol combinations is within a threshold of a second frequency error associated with a second of the plurality of predefined symbol combinations; and generate a symbol error notification based on the symbol error detector determining that the first frequency error associated with the first of the plurality of predefined symbol combinations is within the threshold of the second frequency error associated with the second of the plurality of predefined symbol combinations.

14. The wireless network device of claim 13, wherein the symbol error detector operable to determine that the first frequency error associated with the first of the plurality of predefined symbol combinations is within the threshold of the second frequency error associated with the second of the plurality of predefined symbol combinations further comprises the symbol error detector operable to:

determine a ratio of the first frequency error associated with the first of the plurality of predefined symbol combinations and the second frequency error associated with the second of the plurality of predefined symbol combinations; and compare the ratio against the threshold for determining that the frequency error associated with the first of the plurality of predefined symbol combinations is within the threshold of the frequency error associated with the second of the plurality of predefined symbol combinations.

15. The wireless network device of claim 13, wherein the symbol error detector is further operable to:

group the plurality of predefined symbol combinations to form a plurality of symbol groups, wherein each of the plurality of predefined symbol combinations comprises an estimated previously decoded symbol, an estimated current symbol, and an estimated subsequent symbol, wherein a subset of the plurality of predefined symbol combinations that constitute each of the plurality of symbol groups differ only in the estimated subsequent symbol;

for each of the plurality of symbol groups, compare frequency errors associated with the subset of the plurality of predefined symbol combinations that constitute each of the plurality of symbol groups to identify a minimum frequency error associated with each of the plurality of symbol groups;

in response to determining a previously decoded symbol, identify a first and a second of the plurality of symbol groups that constitute predefined symbol combinations with the previously decoded symbol; and determine a ratio of a first minimum frequency error associated with the first of the plurality of symbol groups and a second minimum frequency error associated with the second of the plurality of symbol groups, wherein the first minimum frequency error associated with the first of the plurality of symbol groups is the first frequency error associated with the first of the plurality of predefined symbol combinations and the second minimum frequency error associated with the second of the plurality of symbol groups is the second frequency error associated with the second of the plurality of predefined symbol combinations.

16. The wireless network device of claim 15, wherein the symbol error detector operable to determine that the first frequency error associated with the first of the plurality of predefined symbol combinations is within the threshold of the second frequency error associated with the second of the plurality of predefined symbol combinations further comprises the symbol error detector operable to:

compare the ratio of the first minimum frequency error associated with the first of the plurality of symbol groups and the second minimum frequency error associated with the second of the plurality of symbol groups against the threshold.

17. The wireless network device of claim 13, wherein the symbol error detector operable to generate the symbol error notification further comprises the symbol error detector operable to:
  determine a number of symbols between a current symbol error and a previously detected symbol error, wherein the current symbol error is associated with the first symbol of the received signal;
  compare the number of symbols between the current symbol error and the previously detected symbol error to a predetermined burst length threshold, wherein the predetermined burst length threshold indicates a minimum number of symbols between two consecutive symbol errors that will cause an erroneously demodulated symbol to be undetected; and
  generate the symbol error notification in response to the symbol error detector determining that the first frequency error associated with the first of the plurality of predefined symbol combinations is within the threshold of the second frequency error associated with the second of the plurality of predefined symbol combinations and that the number of symbols between the current symbol error and the previously detected symbol error is greater than the predetermined burst length threshold.

18. A non-transitory machine-readable storage media, having instructions stored therein, which, when executed by one or more processors causes the one or more processors to perform operations that comprise:
  determining a frequency associated with a first symbol of a signal received at a receiver of a wireless network device, wherein the received signal comprises a plurality of symbols;
  generating, at each of a plurality of filters matched to a frequency response of the receiver for a corresponding each of a plurality of predefined symbol combinations, a frequency output associated with each of the plurality of predefined symbol combinations;
  calculating a frequency error, associated with each of the plurality of predefined symbol combinations, that indicates a difference between the frequency output associated with each of the plurality of predefined symbol combinations and the frequency associated with the first symbol of the received signal;
  determining, based on comparing the frequency error associated with the each of the plurality of predefined symbol combinations, that a first frequency error associated with a first of the plurality of predefined symbol combinations is within a threshold of a second frequency error associated with a second of the plurality of predefined symbol combinations; and
  generating a symbol error notification based on said determining that the first frequency error associated with the first of the plurality of predefined symbol combinations is within the threshold of the second frequency error associated with the second of the plurality of predefined symbol combinations.

19. The non-transitory machine-readable storage media of claim 18, wherein said operation of determining that the first frequency error associated with the first of the plurality of predefined symbol combinations is within the threshold of the second frequency error associated with the second of the plurality of predefined symbol combinations further comprises:
  determining a ratio of the first frequency error associated with the first of the plurality of predefined symbol combinations and the second frequency error associated with the second of the plurality of predefined symbol combinations; and
  comparing the ratio against the threshold for said determining that the frequency error associated with the first of the plurality of predefined symbol combinations is within the threshold of the frequency error associated with the second of the plurality of predefined symbol combinations.

20. The non-transitory machine-readable storage media of claim 18, wherein the operations further comprise:
  grouping the plurality of predefined symbol combinations to form a plurality of symbol groups, wherein each of the plurality of predefined symbol combinations comprises an estimated previously decoded symbol, an estimated current symbol, and an estimated subsequent symbol, wherein a subset of the plurality of predefined symbol combinations that constitute each of the plurality of symbol groups differ only in the estimated subsequent symbol;
  for each of the plurality of symbol groups, comparing frequency errors associated with the subset of the plurality of predefined symbol combinations that constitute each of the plurality of symbol groups to identify a minimum frequency error associated with each of the plurality of symbol groups;
  in response to determining a previously decoded symbol, identifying a first and a second of the plurality of symbol groups that constitute predefined symbol combinations with the previously decoded symbol; and
  determining a ratio of a first minimum frequency error associated with the first of the plurality of symbol groups and a second minimum frequency error associated with the second of the plurality of symbol groups, wherein the first minimum frequency error associated with the first of the plurality of symbol groups is the first frequency error associated with the first of the plurality of predefined symbol combinations and the second minimum frequency error associated with the second of the plurality of symbol groups is the second frequency error associated with the second of the plurality of predefined symbol combinations.

21. The non-transitory machine-readable storage media of claim 20, wherein said operation of determining that the first frequency error associated with the first of the plurality of predefined symbol combinations is within the threshold of the second frequency error associated with the second of the plurality of predefined symbol combinations further comprises:
  comparing the ratio of the first minimum frequency error associated with the first of the plurality of symbol groups and the second minimum frequency error associated with the second of the plurality of symbol groups against the threshold.

22. The non-transitory machine-readable storage media of claim 18, wherein said operation of generating the symbol error notification further comprises:
  determining a number of symbols between a current symbol error and a previously detected symbol error, wherein the current symbol error is associated with the first symbol of the received signal;
  comparing the number of symbols between the current symbol error and the previously detected symbol error to a predetermined burst length threshold, wherein the predetermined burst length threshold indicates a minimum number of symbols between two consecutive symbol errors that will cause an erroneously demodulated symbol to be undetected; and
  generating the symbol error notification in response to determining that the first frequency error associated with the first of the plurality of predefined symbol combinations is within the threshold of the second frequency error associated with the second of the plurality of predefined symbol combinations and that the number of symbols between the current symbol error and the previously detected symbol error is greater than the predetermined burst length threshold.

* * * * *